(12) United States Patent
Hsiao (10) Patent No.: US 10,332,567 B1
(45) Date of Patent: Jun. 25, 2019

(54) HEAT DISSIPATION AND SHOCKPROOF STRUCTURE

(71) Applicant: GETAC TECHNOLOGY CORPORATION, Hsinchu County (TW)

(72) Inventor: Wei-Chung Hsiao, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 0 days.

(21) Appl. No.: 16/028,504

(22) Filed: Jul. 6, 2018

(30) Foreign Application Priority Data

Feb. 23, 2018 (TW) .............................. 107106051 A (51) Int. Cl.
G11B 33/02 (2006.01)
G11B 33/08 (2006.01)

(52) U.S. Cl.
CPC ............ *G11B 33/08* (2013.01); *G11B 33/022* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,958,212 A * | 9/1999 | Yamamura | ............. | G11B 33/08 205/723 |
| 5,999,406 A * | 12/1999 | McKain | ............... | G11B 31/006 165/80.3 |
| 6,283,438 B1 * | 9/2001 | Shimada | ................ | G11B 33/08 248/694 |
| 6,771,495 B2 * | 8/2004 | Fujiwara | ............... | G06F 1/1616 361/679.34 |
| 6,882,528 B2 * | 4/2005 | Chuang | .................. | G11B 33/08 312/223.1 |
| 7,009,835 B2 * | 3/2006 | Desai | ..................... | G11B 33/08 248/633 |
| 7,012,805 B2 * | 3/2006 | Shah | ....................... | G11B 33/08 248/634 |
| 7,036,783 B2 * | 5/2006 | Chen | .................... | G11B 33/128 248/222.11 |
| 8,264,833 B2 * | 9/2012 | Fang | ........................ | G06F 1/187 312/223.1 |
| 2009/0284910 A1 * | 11/2009 | Heo | ...................... | G11B 25/043 361/679.36 |
| 2011/0273827 A1 * | 11/2011 | Kasai | ..................... | G11B 33/08 361/679.01 |
| 2018/0239733 A1 * | 8/2018 | Kuriyama | .............. | G11B 33/08 |

FOREIGN PATENT DOCUMENTS

CN 102301421 A 12/2011
CN 204651000 U 9/2015

* cited by examiner

*Primary Examiner* — Lisa Lea-Edmonds (57) ABSTRACT

A heat dissipation and shockproof structure for an electronic module with a hard disk drive is provided. The heat dissipation and shockproof structure includes a carrying component and an elastomer. The carrying component has a fixed segment and two first extending segments. The first extending segments are connected to two ends of the fixed segment, respectively. The fixed segment is connected to a lateral surface of the hard disk drive. The distance between the first extending segments is greater than the thickness of the hard disk drive. The elastomer is disposed partially on the first extending segments at the very least.

20 Claims, 8 Drawing Sheets

HEAT DISSIPATION AND SHOCKPROOF STRUCTURE

CROSS-REFERENCE TO RELATED APPLICATIONS

This application claims priority from Taiwan Patent Application No. 107106051, filed on Feb. 23, 2018, the entire disclosure of which is hereby incorporated by reference.

BACKGROUND OF THE INVENTION

Field of the Invention

The present disclosure relates to heat dissipation and shockproof structures and, more particularly, to a heat dissipation and shockproof structure for use with a hard disk drive disposed in an electronic device.

Description of the Prior Art

A hard disk drive in a conventional electronic device usually has therein components, such as platters, a read/write head and actuating motors. Hampered operation of the components and structural damage to the platters will occur, if the hard disk drive is severely shaken or compressed while the platters are accessing data. To protect the hard disk drive effectively, a conventional protective structure usually comprises a plurality of foam pads. After the foam pads have enclosed the hard disk drive entirely, both the protective structure and the hard disk drive are fixed in place inside an electronic device. Even if the hard disk drive is shaken when a user lifts the electronic device in operation, puts it on a desk or drops it inadvertently, the foam pads enclosing the hard disk drive will absorb the shock and thus prevent the shock from damaging the components in the hard disk drive.

However, owing to their low thermal conductivity, the foam pads hinder the removal of heat generated from the hard disk drive in operation. As a result, the conventional protective structure only serves to provide protection for the hard disk drive, and the heat generated from the hard disk drive in operation cannot be dissipated through the protective structure, thereby leading to a shortened service life of the hard disk drive. Therefore, it is imperative to provide a novel heat dissipation and shockproof structure.

SUMMARY OF THE INVENTION

It is an objective of the present disclosure to provide a heat dissipation and shockproof structure for use with an electronic module. The electronic module has a hard disk drive. The hard disk drive is disposed on a carrying component of the heat dissipation and shockproof structure. The hard disk drive is suspended inside the electronic module through the carrying component to prevent the hard disk drive from being directly compressed under an external force. The carrying component dissipates heat generated from the hard disk drive in operation.

Another objective of the present disclosure is to provide a heat dissipation and shockproof structure with an elastomer disposed on the carrying component and a thermally conductive layer such that the elastomer effectively absorbs shock arising from the shaking of the electronic device and thus renders the hard disk drive shockproof. The thermally conductive layer is conducive to dissipation of heat generated from the hard disk drive in operation.

In order to achieve the above and other objectives, the present disclosure provides a carrying component and a plurality of elastomers. The carrying component has a fixed segment and two first extending segments. The first extending segments are connected to two ends of the fixed segment, respectively. The fixed segment is connected to a lateral surface of the hard disk drive. The first extending segments are spaced apart in a first direction by a distance greater than a thickness of the hard disk drive in the first direction such that the hard disk drive is substantially disposed between the first extending segments. The elastomers are disposed partially on the first extending segments at the very least.

The first extending segments extend across an upper surface and a lower surface of the hard disk drive, respectively, and thereby form two gaps together with the upper surface and the lower surface, respectively.

The upper surface and the lower surface each define a central area and two peripheral areas, with the central area being between the peripheral areas, allowing the first extending segments to extend across the peripheral areas, respectively, and thus form the gaps together with the peripheral areas, respectively.

The carrying component further has a plurality of second extending segments connected to the first extending segments, respectively, such that the second extending segments form the gaps together with the upper surface and the lower surface, respectively, and the second extending segments are disposed at the central areas of the upper surface and the lower surface.

The elastomers are selectively adhered to the first extending segments, the second extending segments, or a lateral surface of the fixed segment, respectively.

The elastomers and the hard disk drive are disposed on opposing sides of the first extending segments, the second extending segments, or the fixed segment, respectively.

The elastomers and the hard disk drive are further disposed on the same side of the first extending segments, the second extending segments, or the fixed segment.

In an embodiment, the fixed segment has a plurality of hollowed-out areas. In another embodiment, the carrying component is U-shaped such that the fixed segment and the first extending segments jointly form a first opening which opens in an opening direction toward the hard disk drive.

In another embodiment, the carrying component is U-shaped such that the fixed segment and the first extending segments jointly form a first opening which opens in an opening direction away from the hard disk drive.

The electronic module further has a casing which the hard disk drive and the heat dissipation and shockproof structure are received in.

The carrying component and the casing are made of metal, whereas the elastomers are made of foam.

Preferably, the heat dissipation and shockproof structure further comprises at least one thermally conductive layer for covering at least one of the elastomers.

DETAILED DESCRIPTION OF THE EMBODIMENTS

Figure 1:
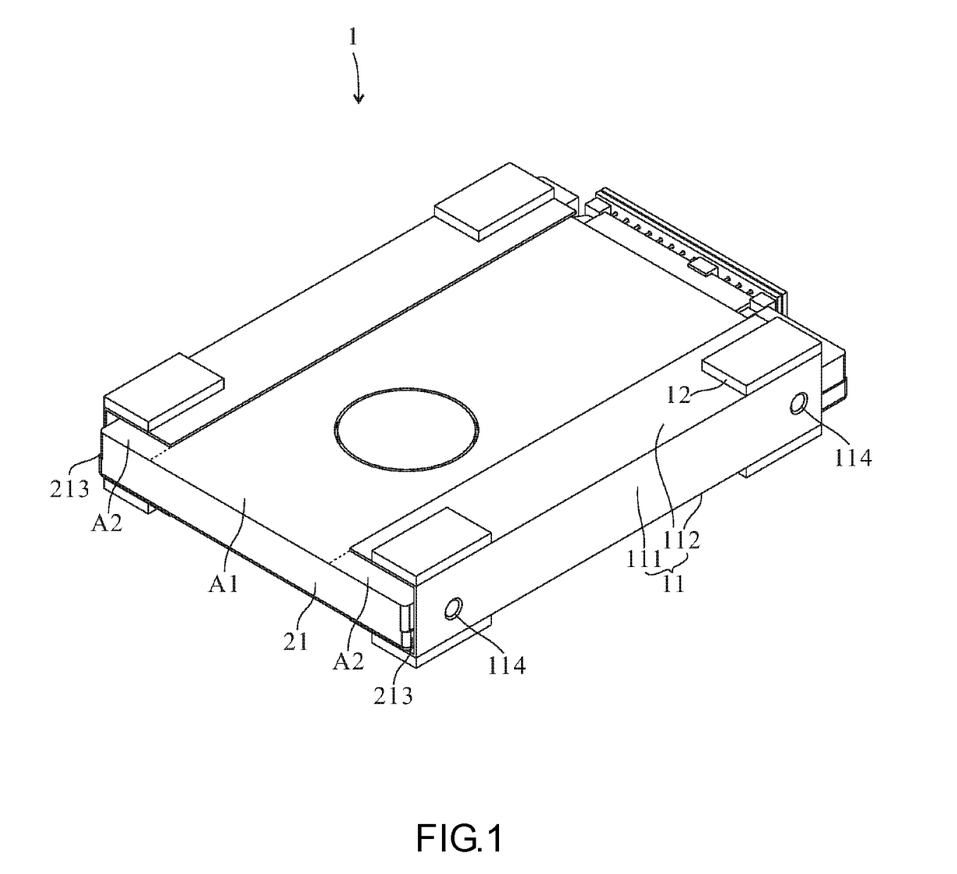
FIG. 1 is a perspective view of a heat dissipation and shockproof structure and a hard disk drive coupled together according to the first embodiment of the present disclosure.
Figure 2:
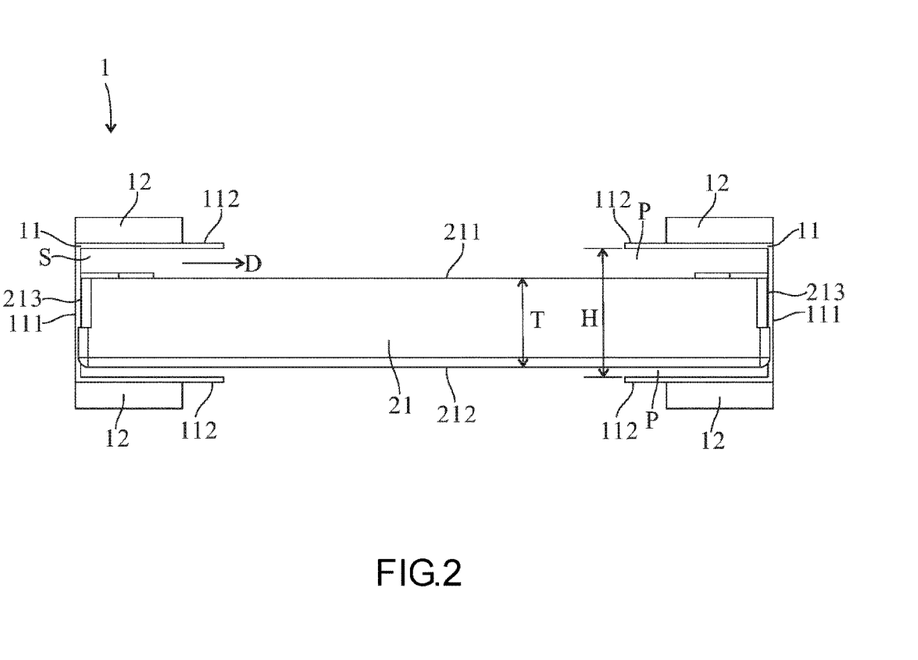
FIG. 2 is a lateral view of the heat dissipation and shockproof structure and the hard disk drive coupled together according to the first embodiment of the present disclosure.

The present disclosure provides a heat dissipation and shockproof structure 1 for an electronic module. Referring to FIG. 1 and FIG. 2, there are shown schematic views of the heat dissipation and shockproof structure 1 and a hard disk drive 21 of an electronic module (not shown) coupled together according to the first embodiment of the present disclosure. In this embodiment, the heat dissipation and shockproof structure 1 comprises two carrying components 11 and a plurality of elastomers 12. The relationship between an electronic module and components of the heat dissipation and shockproof structure 1 is described below.

The carrying components 11 are disposed on two opposing lateral surfaces 213 of the hard disk drive 21, respectively. The carrying components 11 are connected to the hard disk drive 21 in the same manner; hence, this embodiment is exemplified by the connection of the hard disk drive 21 and one of the carrying components 11. The carrying component 11 has a fixed segment 111 and two first extending segments 112. The fixed segment 111 is connected between the first extending segments 112 such that the carrying component 11 is U-shaped. The fixed segment 111 and the first extending segments 112 jointly form a receiving space S such that the hard disk drive 21 is substantially disposed partially in the receiving space S. The fixed segment 111 and the first extending segments 112 jointly form an opening. The opening opens in an opening direction D toward the hard disk drive 21. The fixed segment 111 is connected to the lateral surface 213 of the hard disk drive 21. The first extending segments 112 extend across an upper surface 211 and a lower surface 212 of the hard disk drive 21, respectively. The first extending segments 112 are spaced apart by a distance H greater than a thickness T of the hard disk drive 21. Therefore, as shown in FIG. 2, the first extending segments 112 extend across the upper surface 211 and the lower surface 212 of the hard disk drive 21, respectively; hence, the first extending segments 112 form two gaps P together with the upper surface 211 and the lower surface 212, respectively. The upper surface 211 and the lower surface 212 each define a central area A1 and two peripheral areas A2. The central area A1 is between the peripheral areas A2. The first extending segments 112 extend across the peripheral areas A2, respectively, and thus form the gaps P together with the peripheral areas A2, respectively.

The lateral surfaces 213 of the hard disk drive 21 have a plurality of screw holes (not shown). A plurality of penetrating through holes 114 is disposed at the fixed segment 111 of the carrying component 11 and corresponds in position to the plurality of screw holes. Owing to the screw holes and the through holes 114, it is feasible for the hard disk drive 21 to be fixed to the inner surface of the fixed segment 111.

Figure 3:
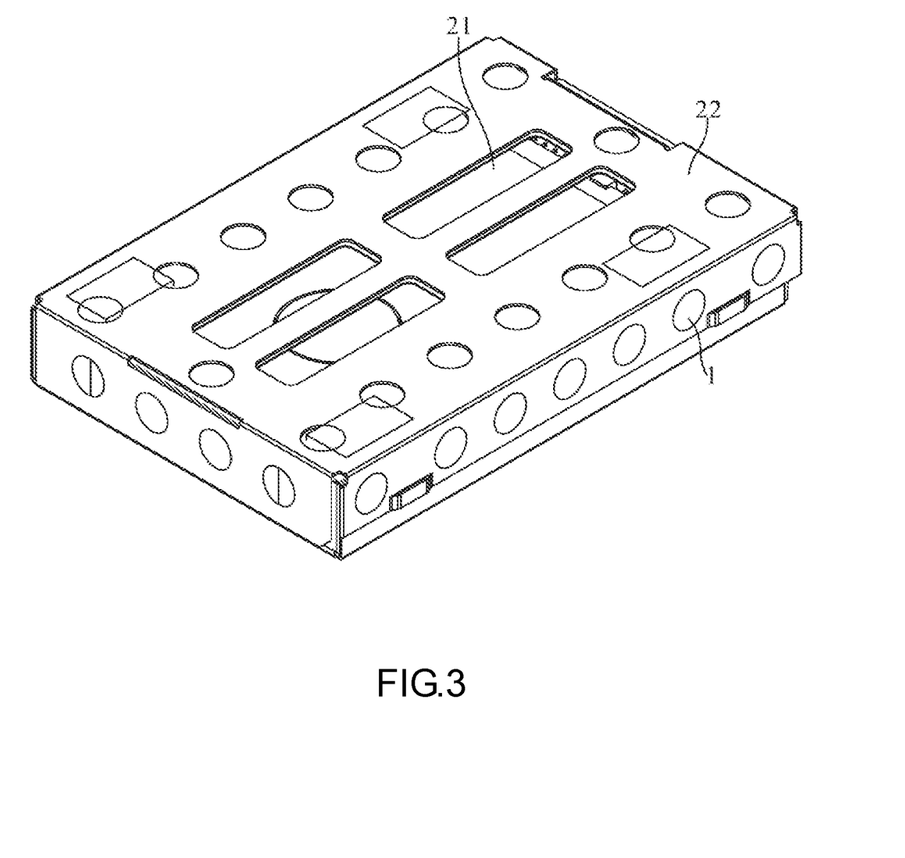
FIG. 3 is a perspective view of the heat dissipation and shockproof structure and an electronic device coupled together according to the first embodiment of the present disclosure.

Referring to FIG. 2, the elastomers 12 are disposed on the first extending segments 112, respectively. As shown in FIG. 3, after being coupled together, the heat dissipation and shockproof structure 1 and the hard disk drive 21 are placed in a casing 22 of an electronic module. Then, the casing 22 is placed in an internal space of an electronic device. Heat generated from the hard disk drive 21 is transferred from the lateral surface 213 of the hard disk drive 21 to the first extending segments 112 via the fixed segment 111 before being dissipated. The casing 22 is also conducive to heat dissipation. The hard disk drive 21 is disposed at the carrying component 11 by partial suspension; hence, compression of the hard disk drive 21 and thus damage to components, such as platters, a read/write head and actuating motors, of the hard disk drive 21 is precluded. The elastomers 12 disposed on the first extending segments 112 absorb shock. Therefore, the heat dissipation and shockproof structure 1 is shockproof and thereby capable of protecting the hard disk drive 21.

Figure 4:
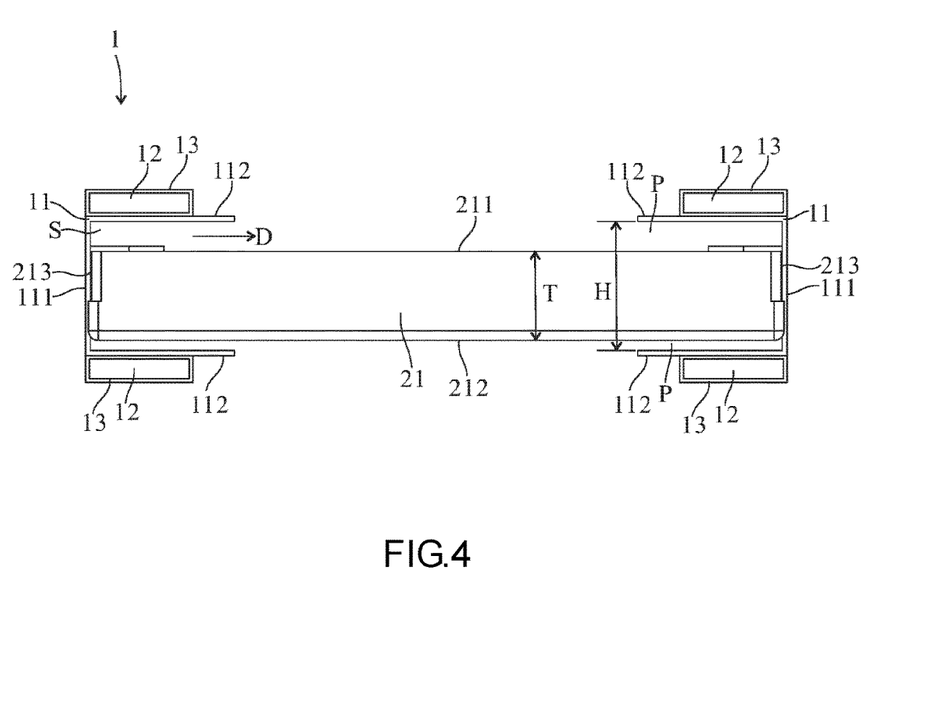
FIG. 4 is a lateral view of the heat dissipation and shockproof structure and the hard disk drive coupled together according to the second embodiment of the present disclosure.

In an embodiment of the present disclosure, the heat dissipation and shockproof structure 1 further comprises a plurality of thermally conductive layers 13. FIG. 4 is a lateral view of the heat dissipation and shockproof structure 1 and the hard disk drive 21 coupled together according to the second embodiment of the present disclosure. As shown in FIG. 4, after the thermally conductive layers 13 have enclosed the elastomers 12, respectively, heat generated from the hard disk drive 21 is transferred to the fixed segment 111, then the first extending segments 112, and finally the thermally conductive layers 13 before being dissipated through the casing 22.

Figure 5:
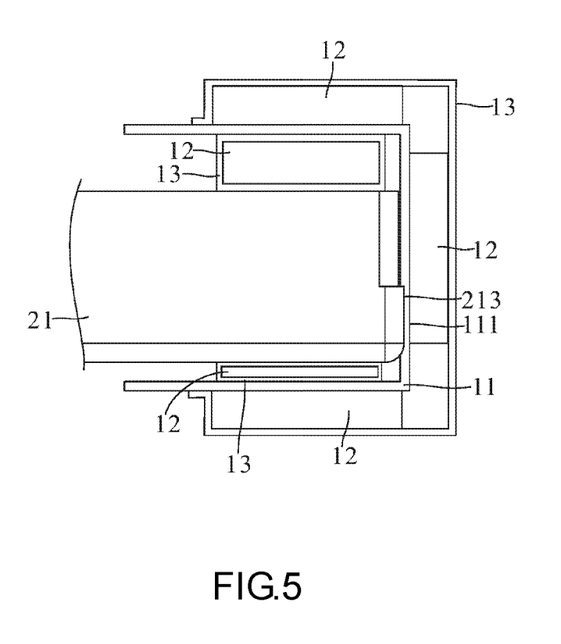
FIG. 5 is a lateral view of the heat dissipation and shockproof structure and the hard disk drive coupled together according to the third embodiment of the present disclosure.

In an embodiment of the present disclosure, arrangement and quantity of the carrying components 11, the elastomers 12 and the thermally conductive layers 13 are subject to change as needed. For instance, FIG. 5 is a lateral view of the heat dissipation and shockproof structure 1 and the hard disk drive 21 coupled together according to the third embodiment of the present disclosure. As shown in FIG. 5, the elastomers 12 are directly disposed on the carrying component 11 and thereby come into direct contact with the carrying component 11 (i.e., the elastomers 12 and the hard disk drive 21 are disposed on opposing sides of the carrying component 11) such that one and only one said thermally conductive layer 13 encloses the elastomers 12 and the carrying component 11. In another embodiment, the carrying components 11 or the elastomers 12 are provided in the number of one as needed, and the thermally conductive layers 13 are dispensed with. The elastomers 12 are not only disposed on the first extending segments 112 but also disposed on the fixed segment 111; hence, the lateral surfaces 213 of the hard disk drive 21 are protected by the elastomers 12. Alternatively, as shown in FIG. 5, after being enclosed by the thermally conductive layers 13, the elastomers 12 are each disposed between the extending segments 112 and the upper surface 211 or the lower surface 212 of the hard disk drive 21 (i.e., after being enclosed by the thermally conductive layers 13, the elastomers 12 and the hard disk drive 21 are disposed on the same side of the carrying component 11.)

When each thermally conductive layer 13 encloses a corresponding one of the elastomers 12 and fills the gap P between a corresponding one of the extending segments 112 and the upper surface 211 or the lower surface 212 of the hard disk drive 21, the elastomers 12 simultaneously exert forward forces upon the upper surface 211 and the lower surface 212 of the hard disk drive 21. Hence, not only are the lateral surfaces 213 of the hard disk drive 21 dispensed with screw holes, but the fixed segment 111 of the carrying component 11 is also dispensed with the through holes 114. The hard disk drive 21 is clamped under the forward forces exerted by the elastomers 12 and thereby fixed in place inside the receiving space S.

The carrying components 11, the thermally conductive layers 13 and the casing 22 are made of metal, whereas the elastomers 12 are made of foam, but the present disclosure is not limited thereto. The elastomers 12 have a higher modulus of elasticity than the thermally conductive layers 13, whereas the thermally conductive layers 13 have a higher coefficient of thermal conductivity than the elastomers 12; hence, all materials which are shockproof and conducive to heat dissipation are applicable to the present disclosure.

Figure 6:
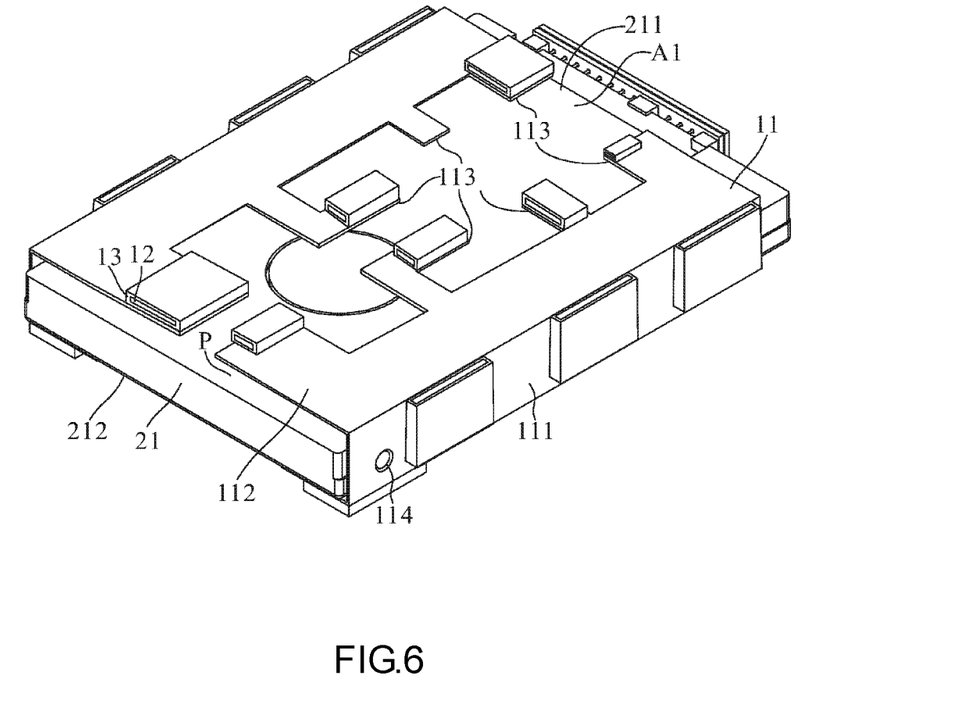
FIG. 6 is a perspective view of the heat dissipation and shockproof structure and the hard disk drive coupled together according to the fourth embodiment of the present disclosure.

FIG. 6 is a perspective view of the heat dissipation and shockproof structure 1 and the hard disk drive 21 coupled together according to the fourth embodiment of the present disclosure. This embodiment differs from the preceding embodiment in that this embodiment features a plurality of second extending segments 113. The second extending segments 113 are connected to the first extending segments 112, respectively. The second extending segments 113 are disposed above and extend across the central area A1 of the upper surface 211 and the central area A1 of the lower surface 212. Likewise, the second extending segments 113 are each spaced apart from the upper surface 211 and the lower surface 212 by a distance to form the gaps P, so as to increase heat transfer areas of the carrying components 11. The elastomers 12 are disposed on the first extending segments 112, the second extending segments 113 and the fixed segments 111. The elastomers 12 are enclosed by the thermally conductive layers 13 and then disposed on the carrying components 11. In a variant embodiment, the elastomers 12 are directly disposed on the carrying components 11, and then the thermally conductive layers 13 simultaneously enclose the elastomers 12 and the carrying components 11; alternatively, the variant embodiment involves retaining the elastomers 12 but removing the thermally conductive layers 13.

Figure 7:
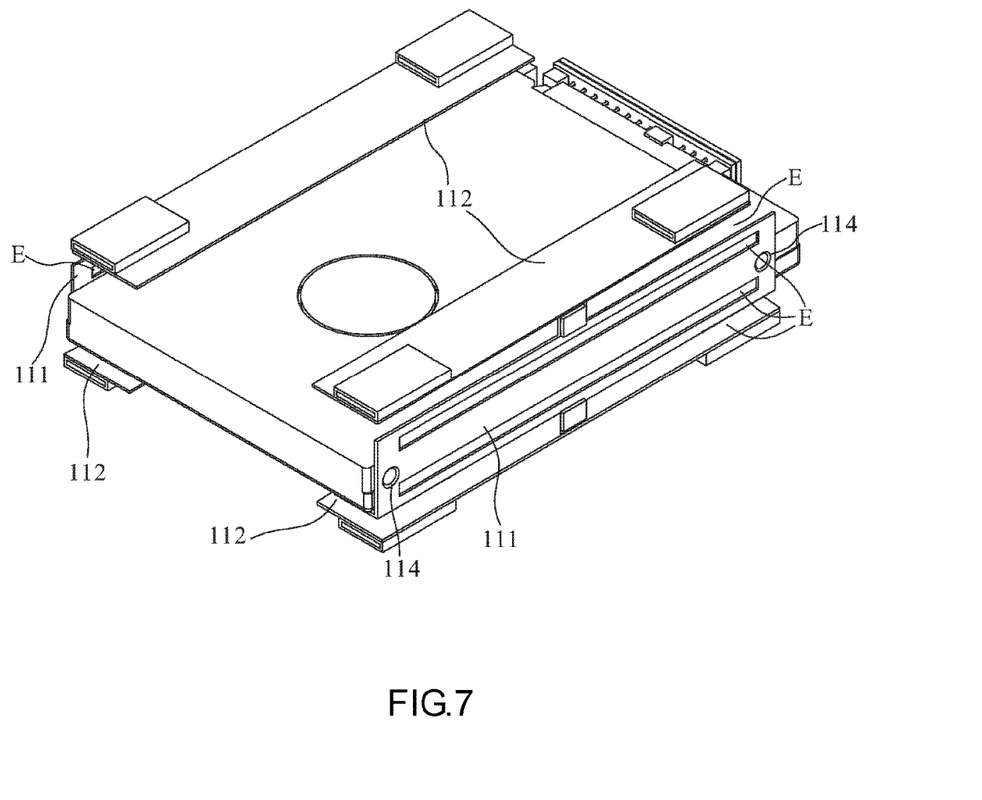
FIG. 7 is a perspective view of the heat dissipation and shockproof structure and the hard disk drive coupled together according to the fifth embodiment of the present disclosure.

FIG. 7 is a perspective view of the heat dissipation and shockproof structure 1 and the hard disk drive 21 coupled together according to the fifth embodiment of the present disclosure. This embodiment is substantially the same as the first embodiment in structure. But this embodiment differs from the preceding embodiment in that, in this embodiment, the first extending segments 112 and the fixed segment 111 each further have a plurality of hollowed-out areas E formed as a result of removal of minor heat transfer blocks to not only reduce the weight of the carrying components 11 but also effectuate heat transfer.

Figure 8:
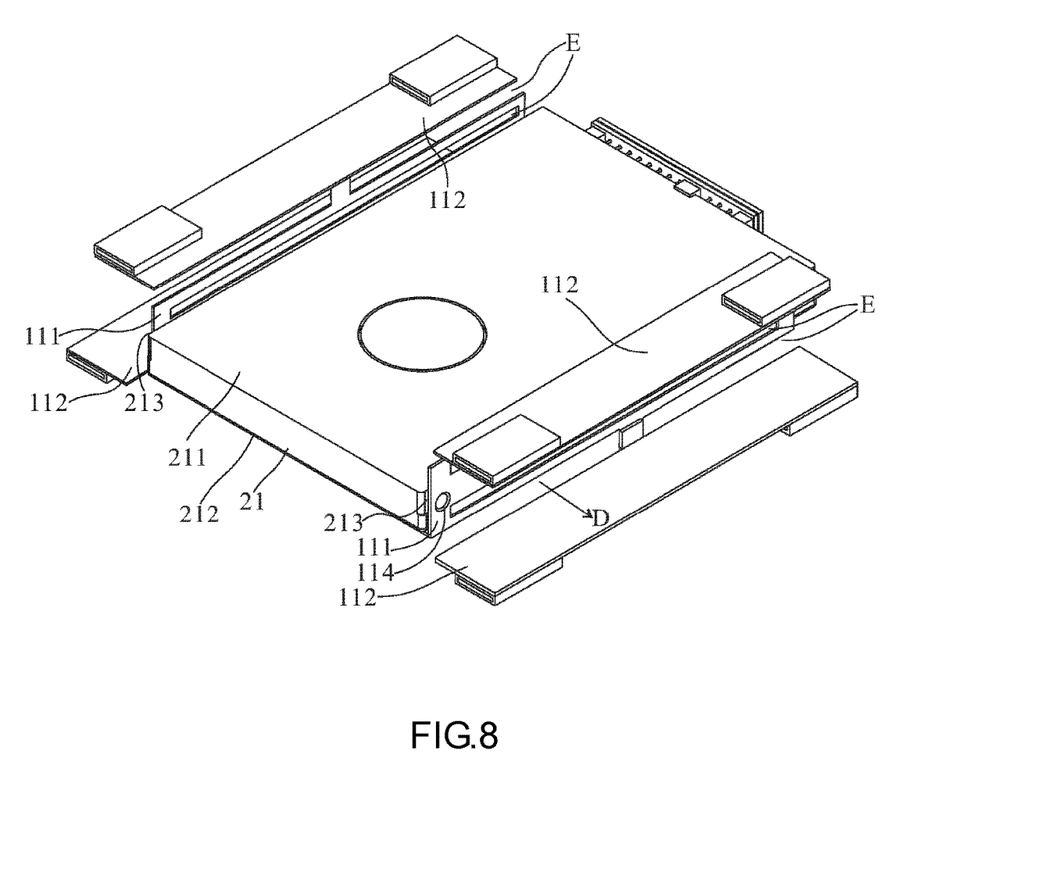
FIG. 8 is a perspective view of the heat dissipation and shockproof structure and the hard disk drive coupled together according to the sixth embodiment of the present disclosure.

FIG. 8 is a perspective view of the heat dissipation and shockproof structure 1 and the hard disk drive 21 coupled together according to the sixth embodiment of the present disclosure. Like the fifth embodiment, the sixth embodiment is characterized in that the first extending segments 112 and the fixed segment 111 each have the plurality of hollowed-out areas E. However, the sixth embodiment is distinguished from the preceding embodiments in that, in the sixth embodiment, after the fixed segment 111 has been connected to the lateral surfaces 213 of the hard disk drive 21, the first extending segments 112 extend outward in a direction away from the hard disk drive 21, and the first extending segments 112 are absent from above and below the upper surface 211 and the lower surface 212 of the hard disk drive 21. Hence, the fixed segment 111 and the first extending segments 112 jointly form an opening which opens in an opening direction D away from the hard disk drive 21.

In conclusion, the present disclosure provides a heat dissipation and shockproof structure for use with a hard disk drive. The hard disk drive is suspended between carrying components of the heat dissipation and shockproof structure. The carrying components not only dissipate heat generated from the hard disk drive in operation, but also provide first-tier protection for the hard disk drive to protect the hard disk drive against compression. Elastomers of the heat dissipation and shockproof structure absorb shock effectively and thereby provide second-tier protection for the hard disk drive. Thermally conductive layers of the heat dissipation and shockproof structure further enhance dissipation of heat generated from the hard disk drive in operation. Therefore, the heat dissipation and shockproof structure is effective in dissipating heat and absorbing shock.

The above embodiments are illustrative of implementation of the present disclosure and descriptive of technical features of the present disclosure rather than restrictive of the scope of the present disclosure. All changes or equivalent modifications readily made by persons skilled in the art to the aforesaid embodiments shall fall within the claimed scope of the present disclosure. Accordingly, the legal protection for the present disclosure shall be defined by the appended claims.

What is claimed is:

1. A heat dissipation and shockproof structure for an electronic module with a hard disk drive, the heat dissipation and shockproof structure comprising:
    a carrying component having a fixed segment and two first extending segments, the first extending segments being connected to two ends of the fixed segment, respectively, and the fixed segment being connected to a lateral surface of the hard disk drive, wherein the first extending segments are spaced apart in a first direction by a distance greater than a thickness of the hard disk drive in the first direction such that the hard disk drive is substantially disposed between the first extending segments; and
    a plurality of elastomers disposed on at least a portion of the first extending segments;
    wherein the first extending segments extend across an upper surface and a lower surface of the hard disk drive, respectively, and thereby form two gaps together with the upper surface and the lower surface, respectively.

2. The heat dissipation and shockproof structure of claim 1, wherein the upper surface and the lower surface each define a central area and two peripheral areas, with the central area being between the peripheral areas, allowing the first extending segments to extend across the peripheral areas, respectively, and thus form the gaps together with the peripheral areas, respectively.

3. The heat dissipation and shockproof structure of claim 2, wherein the carrying component further has a plurality of second extending segments connected to the first extending segments, respectively, such that the second extending segments form the gaps together with the upper surface and the lower surface, respectively, and the second extending segments are disposed at the central areas of the upper surface and the lower surface.

4. The heat dissipation and shockproof structure of claim 3, wherein the elastomers are selectively adhered to the first extending segments, the second extending segments, or a lateral surface of the fixed segment, respectively.

5. The heat dissipation and shockproof structure of claim 4, wherein the elastomers and the hard disk drive are disposed on opposing sides of the first extending segments, the second extending segments, or the fixed segment, respectively.

6. The heat dissipation and shockproof structure of claim 4, wherein the elastomers and the hard disk drive are disposed on the same side of the first extending segments, the second extending segments, or the fixed segment.

7. The heat dissipation and shockproof structure of claim 1, wherein the fixed segment has a plurality of hollowed-out areas.

8. The heat dissipation and shockproof structure of claim 2, wherein the carrying component is U-shaped such that the fixed segment and the first extending segments jointly form a first opening which opens in an opening direction toward the hard disk drive.

9. The heat dissipation and shockproof structure of claim 1, wherein the carrying component is U-shaped such that the fixed segment and the first extending segments jointly form a first opening which opens in an opening direction away from the hard disk drive.

10. The heat dissipation and shockproof structure of claim 1, wherein the electronic module further has a casing in which the hard disk drive and the heat dissipation and shockproof structure are received.

11. The heat dissipation and shockproof structure of claim 10, wherein the carrying component and the casing are made of metal, whereas the elastomers are made of foam.

12. A heat dissipation and shockproof structure for an electronic module with a hard disk drive, the heat dissipation and shockproof structure comprising:
 a carrying component having a fixed segment and two first extending segments, the first extending segments being connected to two ends of the fixed segment, respectively, and the fixed segment being connected to a lateral surface of the hard disk drive, wherein the first extending segments are spaced apart in a first direction by a distance greater than a thickness of the hard disk drive in the first direction such that the hard disk drive is substantially disposed between the first extending segments;
 a plurality of elastomers disposed on at least a portion of the first extending segments; and
 at least one thermally conductive layer for covering at least one of the elastomers.

13. The heat dissipation and shockproof structure of claim 12, wherein the first extending segments extend across an upper surface and a lower surface of the hard disk drive, respectively, and thereby form two gaps together with the upper surface and the lower surface, respectively.

14. The heat dissipation and shockproof structure of claim 13, wherein the upper surface and the lower surface each define a central area and two peripheral areas, with the central area being between the peripheral areas, allowing the first extending segments to extend across the peripheral areas, respectively, and thus form the gaps together with the peripheral areas, respectively, and wherein the carrying component further has a plurality of second extending segments connected to the first extending segments, respectively, such that the second extending segments form the gaps together with the upper surface and the lower surface, respectively, and the second extending segments are disposed at the central areas of the upper surface and the lower surface.

15. The heat dissipation and shockproof structure of claim 14, wherein the elastomers are selectively adhered to the first extending segments, the second extending segments, or a lateral surface of the fixed segment, respectively.

16. The heat dissipation and shockproof structure of claim 15, wherein the elastomers and the hard disk drive are disposed on opposing sides of the first extending segments, the second extending segments, or the fixed segment, respectively.

17. The heat dissipation and shockproof structure of claim 15, wherein the elastomers and the hard disk drive are disposed on the same side of the first extending segments, the second extending segments, or the fixed segment.

18. The heat dissipation and shockproof structure of claim 12, wherein the fixed segment has a plurality of hollowed-out areas.

19. The heat dissipation and shockproof structure of claim 14, wherein the carrying component is U-shaped such that the fixed segment and the first extending segments jointly form a first opening which opens in an opening direction toward the hard disk drive.

20. The heat dissipation and shockproof structure of claim 12, wherein the carrying component is U-shaped such that the fixed segment and the first extending segments jointly form a first opening which opens in an opening direction away from the hard disk drive.

* * * * *